Jan. 29, 1963  E. MAYER  3,075,780
SLIDE RING PACKING
Filed Feb. 1, 1960
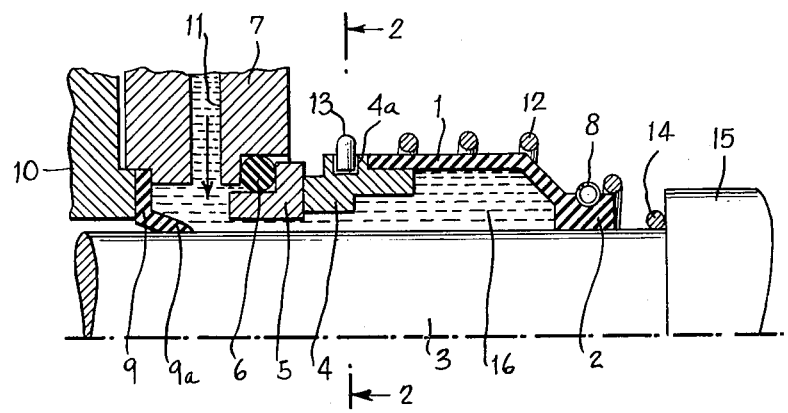
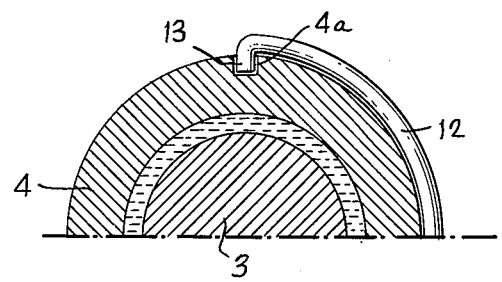
INVENTOR:
EHRHARD MAYER
BY
Robert Henderson
ATTORNEY United States Patent Office 3,075,780
Patented Jan. 29, 1963

3,075,780
SLIDE RING PACKING
Ehrhard Mayer, Palmyra, N.Y., assignor to Garlock Inc., a corporation of New York
Filed Feb. 1, 1960, Ser. No. 5,740
Claims priority, application Germany Mar. 28, 1959
1 Claim. (Cl. 277—59)

This invention relates to a slide ring packing comprising an elastic bellows connecting the slide ring to a related shaft and a spring, which closely surrounds the bellows to prevent bursting of the latter from internal pressure, and has opposite ends in engagement with the shaft and slide ring to cause the latter to turn with the shaft.

In the radial and axial sealing of shafts, it is known that slide ring packings may be used wherein the slide ring is sealingly held against an annular backing surface by axial spring action. Also, torque was transmitted by a rubber bellows having an adhering portion of heavier cross-section mounted on the shaft and tightly gripping the latter. Packings having the just-stated characteristics have proved especially suitable for sealing pump shafts. It is also known that a space between the shaft and bellows may be filled with a lubricant, so that a permanent film of lubricant is maintained between the slide ring and the mentioned backing surface. This arrangement has proved advantageous for sealing shafts of pumps for thick media.

Disadvantages, however, have been found to be that when the lubricant pressure is too high, the bellows may easily burst and/or the excessive dilation of the bellows may cause the lubricant to leak between the shaft and the shaft-adhering portion of the bellows. These disadvantages have hitherto been remedied by providing auxiliary metal hoops to enclose the bellows and thus prevent bursting thereof. Such separate hoops, however, engender difficulties in manufacture and in providing against material shifting of the hoops when the seal is in use.

According to the present invention, the spring which holds the slide ring axially against the backing surface is arranged to closely surround the elastic bellows; one end of the spring engaging a recess in the slide ring and the other end firmly embracing the shaft or a sleeve mounted upon it. This ensures that the torque is transmitted from the shaft through the spring to the slide ring; the rubber bellows being at the same time protected against bursting or excessive inflation by the turns of the spring. Such a spring arrangement affords the additional advantage that the outside diameter of the seal becomes substantially constant, and the elastic bellows is prevented from making sliding contact with a surrounding machine part and thereby becoming rapidly worn and weakened. This disposition of the spring, in close surrounding relation to the bellows, makes the seal of simpler construction, more economical to produce, and more dependable in operation than prior seals possessing similar qualities.

An illustrative embodiment of this invention is shown in the accompanying drawing without, however, limiting the invention to that particular embodiment.

In the drawing:
FIG. 1 is an axial sectional view of a preferred embodiment of the invention; and
FIG. 2 is a transverse sectional view substantially on the line 2—2 of FIG. 1.

The illustrated seal includes a resilient bellows 1 having a reduced but thickened back end portion 2 which encircles and tightly grips shaft 3, this gripping effect being enhanced by a contractile garter spring 8. Slide ring 4 is fixedly secured to the front end of the bellows by vulcanization or other suitable means. The slide ring is in sliding, sealing contact with non-rotating backing ring 5 which is somewhat resiliently supported at the shaft opening of a machine housing 7 by an intervening round rubber ring 6. Forwardly of the backing ring, the machine housing is sealed off by a sealing ring 9, a skirt or sealing flange 9a of which is in sliding engagement with the shaft. An annular member 10, suitably fixed to the housing 7, holds the sealing ring 9 in fixed, sealing association with the housing.

A compressed helical spring 12 is of such character and so arranged that its back end turn 14 rests against shoulder 15 of the shaft and preferably is in contractile gripping relation to the underlying cylindrical surface of the shaft; and this spring's front end turn 13 engages within recess 4a of slide ring 4. Thus, the spring 12 serves to keep the slide ring in continuous, sliding, sealing contact with backing ring 5 and serves also to transmit torque from the shaft to the slide ring to constrain the latter to turn with the shaft. Moreover, the turns of the spring 12, closely encircling the bellows 1 and being sufficiently close to each other for the purpose, prevent excessive dilation and/or bursting of the bellows from internal pressure such as may be present in grease or other lubricant which may be introduced through passage 11 (as indicated by arrow) into annular space 16 inside of the bellows.

It will be understood that, despite the thickness of the bellows' back end portion 2 and the contractile effect of the garter spring 8, and in the absence of further means, excessive dilation of the bellows may occur from internal pressure and cause the bellows' back end portion 2 to ease up its grip on the shaft and permit lubricant to leak, along the shaft, from the back end of space 16. A turn or turns of the spring 12, closely encircling said back end portion 2, are very effective to prevent such dilation of the latter.

I claim:
A slide ring packing for sealing a shaft relatively to a related machine housing, said packing comprising a slide ring surrounding said shaft, a resilient, annular bellows of relatively soft rubber-like material, having a substantially cylindrical front end portion sealingly fixed at its forward end to said slide ring and extending substantially rearwardly of said slide ring, and said bellows having a rear end portion in fluid-tight engagement with said shaft, and the packing further comprising a coil spring, separate from said bellows, axially compressed between said shaft and said slide ring to urge the latter continuously into sliding, sealing association with an opposed, annular surface of the machine housing; and spring closely encircling said bellows throughout the latter's length to limit dilation of the bellows from fluid pressure therewithin and to hold said rear end in such fluid-tight engagement with the shaft, and said spring having its forward end in driving association with said slide ring and its rearward end in contractile, gripping engagement with said shaft, rearwardly of the rear end portion of the bellows, to constrain the slide ring to turn with the shaft; said packing further including a sealing ring, forwardly of and spaced from said slide ring, effecting a seal between the housing and shaft, and, with said bellows and slide ring, defining an annular lubricant space between the shaft and said bellows; said housing having a lubricant passage therein opening into said lubricant space between said sealing ring and said slide ring.

References Cited in the file of this patent
UNITED STATES PATENTS

| | | |
|---|---|---|
| 2,207,371 | Blackmore et al. | July 9, 1940 |
| 2,221,496 | Teeple | Nov. 12, 1940 |
| 2,299,638 | Marvin | Oct. 20, 1942 |
| 2,403,298 | Payne | July 2, 1946 |
| 2,411,509 | Endebak | Nov. 26, 1946 |
| 2,497,479 | Vlach | Feb. 14, 1950 |
| 2,884,268 | Amirault | Apr. 28, 1959 |

UNITED STATES PATENT OFFICE
CERTIFICATE OF CORRECTION

Patent No. 3,075,780                                     January 29, 1963

Ehrhard Mayer

It is hereby certified that error appears in the above numbered patent requiring correction and that the said Letters Patent should read as corrected below.

Column 2, line 47, for "and" read -- said --.

Signed and sealed this 6th day of August 1963.

(SEAL)
Attest:

ERNEST W. SWIDER
Attesting Officer

DAVID L. LADD
Commissioner of Patents